Figure 1:
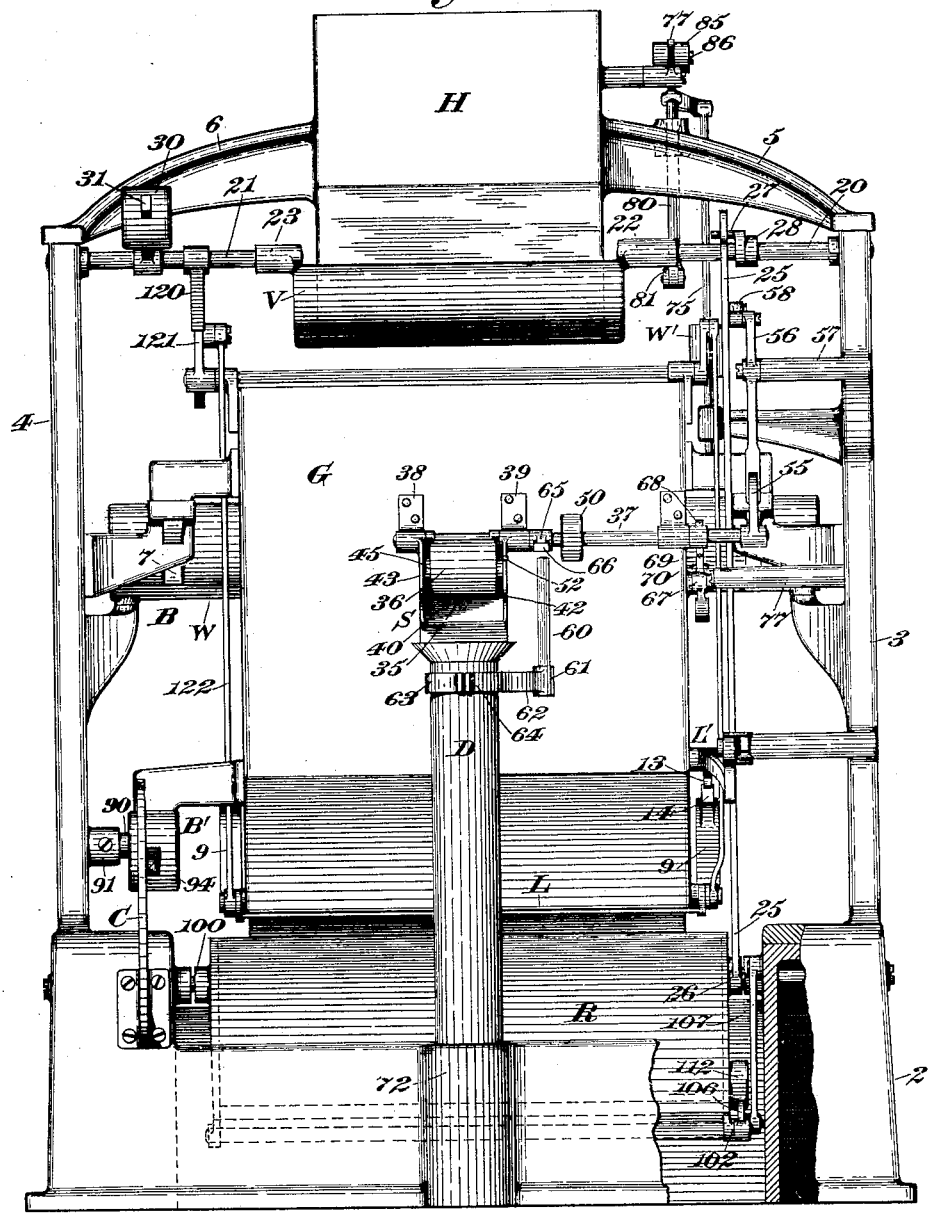

(No Model.)  8 Sheets—Sheet 1.

F. H. RICHARDS.
AUTOMATIC WEIGHING MACHINE.

No. 600,035.  Patented Mar. 1, 1898.

Witnesses:
Chas. D. King.
Fred. J. Dole.

Inventor:
F. H. Richards.

(No Model.)

8 Sheets—Sheet 2.

F. H. RICHARDS.
AUTOMATIC WEIGHING MACHINE.

No. 600,035. Patented Mar. 1, 1898.

Witnesses:
Chas. N. King.
Fred. J. Dole.

Inventor:
F. H. Richards.

(No Model.)

8 Sheets—Sheet 3.

F. H. RICHARDS.
AUTOMATIC WEIGHING MACHINE.

No. 600,035. Patented Mar. 1, 1898.

Witnesses
Chas. H. King.
Fred. J. Dole.

Inventor.
F. H. Richards.

(No Model.) 8 Sheets—Sheet 5.
F. H. RICHARDS.
AUTOMATIC WEIGHING MACHINE.

No. 600,035. Patented Mar. 1, 1898.

Witnesses:
Chas. D. King.
Fred. J. Dole.

Inventor:
F. H. Richards.

(No Model.)

F. H. RICHARDS.
AUTOMATIC WEIGHING MACHINE.

No. 600,035. Patented Mar. 1, 1898.

Witnesses:
Chas. D. King.
Fred. J. Dole.

Inventor:
F. H. Richards.

(No Model.) 8 Sheets—Sheet 7.
F. H. RICHARDS.
AUTOMATIC WEIGHING MACHINE.
No. 600,035. Patented Mar. 1, 1898.
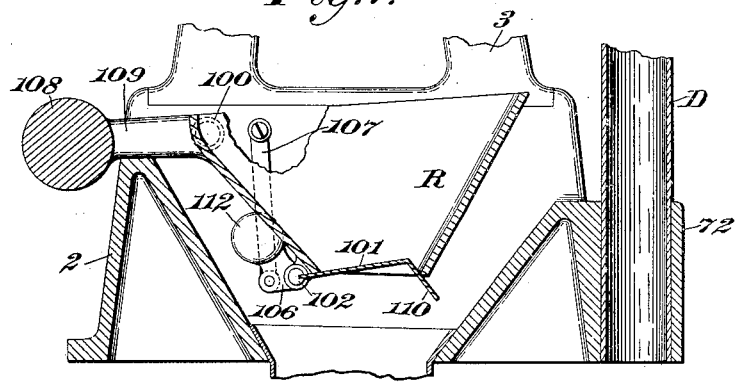
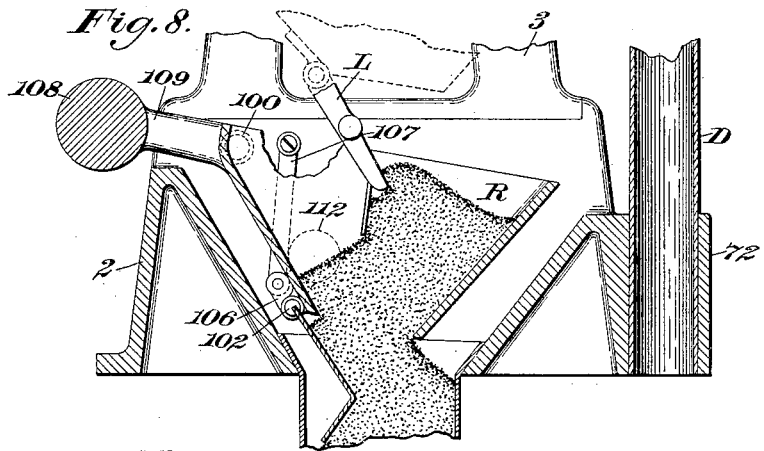
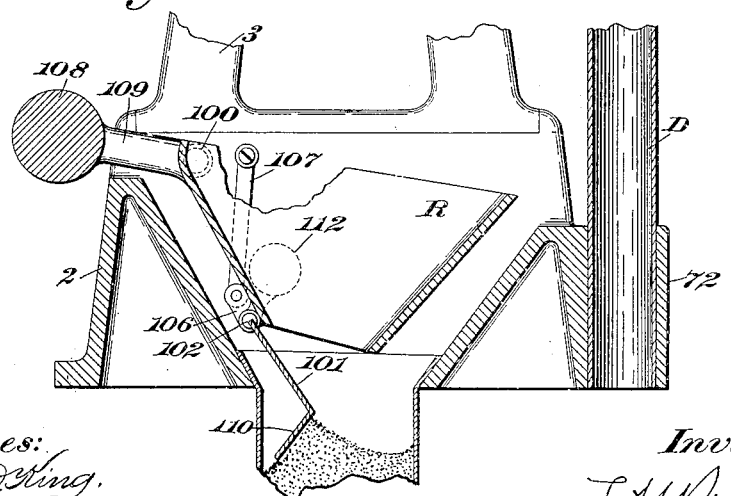
Witnesses:
Chas. D. King.
Fred. J. Dole.
Inventor:
F. H. Richards.

(No Model.) 8 Sheets—Sheet 8.
F. H. RICHARDS.
AUTOMATIC WEIGHING MACHINE.
No. 600,035. Patented Mar. 1, 1898.
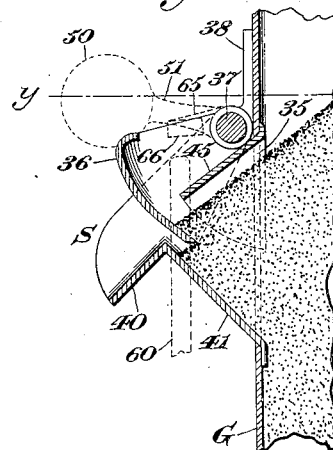
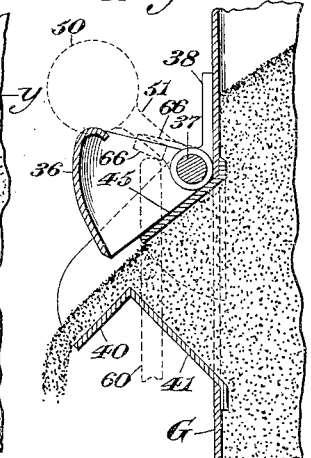
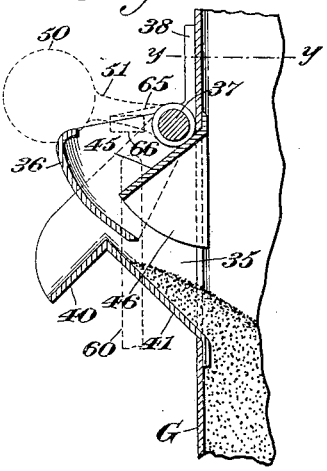
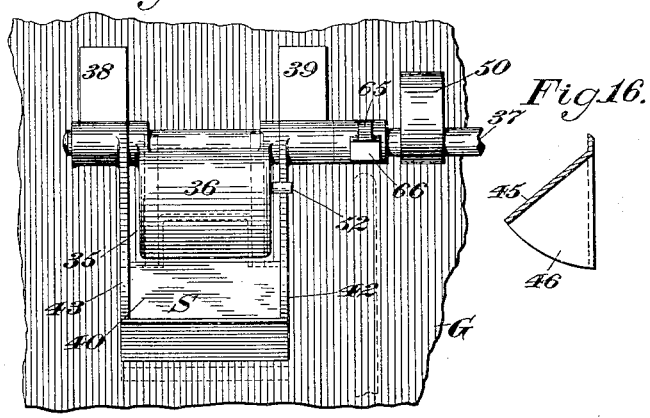
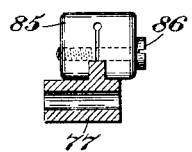
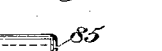
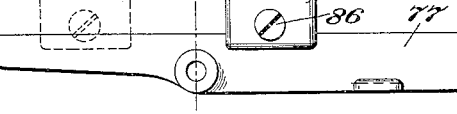
Witnesses:
Chas. D. King.
Fred. J. Dole.
Inventor:
F. H. Richards.

UNITED STATES PATENT OFFICE.

FRANCIS H. RICHARDS, OF HARTFORD, CONNECTICUT.

AUTOMATIC WEIGHING-MACHINE.

SPECIFICATION forming part of Letters Patent No. 600,035, dated March 1, 1898.

Application filed May 10, 1897. Serial No. 635,832. (No model.)

*To all whom it may concern:*

Be it known that I, FRANCIS H. RICHARDS, a citizen of the United States, residing at Hartford, in the county of Hartford and State of Connecticut, have invented certain new and useful Improvements in Automatic Weighing-Machines, of which the following is a specification.

This invention relates to weighing-machines for automatically weighing various kinds of granular and similar substances, certain of the improvements being especially adapted for application to machines of the kind disclosed by Letters Patent No. 572,067, granted to me November 24, 1896.

One of the objects of the invention is to provide, in connection with the weighing mechanism, a resistance device or counterpoise preferably supported independently of the weighing mechanism and in position to apply its effect thereto when the load-receiver is in its highest position, means being employed to throw said resistance device out of action relatively to the weighing mechanism at the commencement of the poising period, whereby the load can be accurately poised. In the present case the resistance device is in the form of a weight designed to be used in conjunction with the overloading means, it being adapted to exert its effect to compensate for the overload and to prevent the load-receiver from descending prematurely.

Another object of the invention is to furnish means, preferably supported independently of the weighing mechanism, for actuating or retracting the stream-controller, said actuating means embodying a valved regulator-hopper supported to receive and to be lowered by the loads intermittingly discharged from the load-receiver, said regulator-hopper on its ascending stroke being adapted to furnish the requisite power to open the stream-controller.

Another object is to employ, in conjunction with the weighing mechanism, a scale or graduated plate the pointer of which in the present instance consists of an auxiliary beam provided with a slidable counterweight, and by this means the accuracy of the work can be determined at all times and any deficiency or inequality of weight between the counterpoising mechanism and the load-receiver can be obviated by sliding the weight along the auxiliary beam.

Another object of the invention is to provide means for overloading or overcharging the load-receiver and for subsequently effecting the removal of the excess, which results are preferably accomplished by positively holding the overloading-valve in its open position and by also maintaining the load-reducing valve successively in its closed and open positions for a sufficient duration of time to insure the foregoing results.

Figure 2:
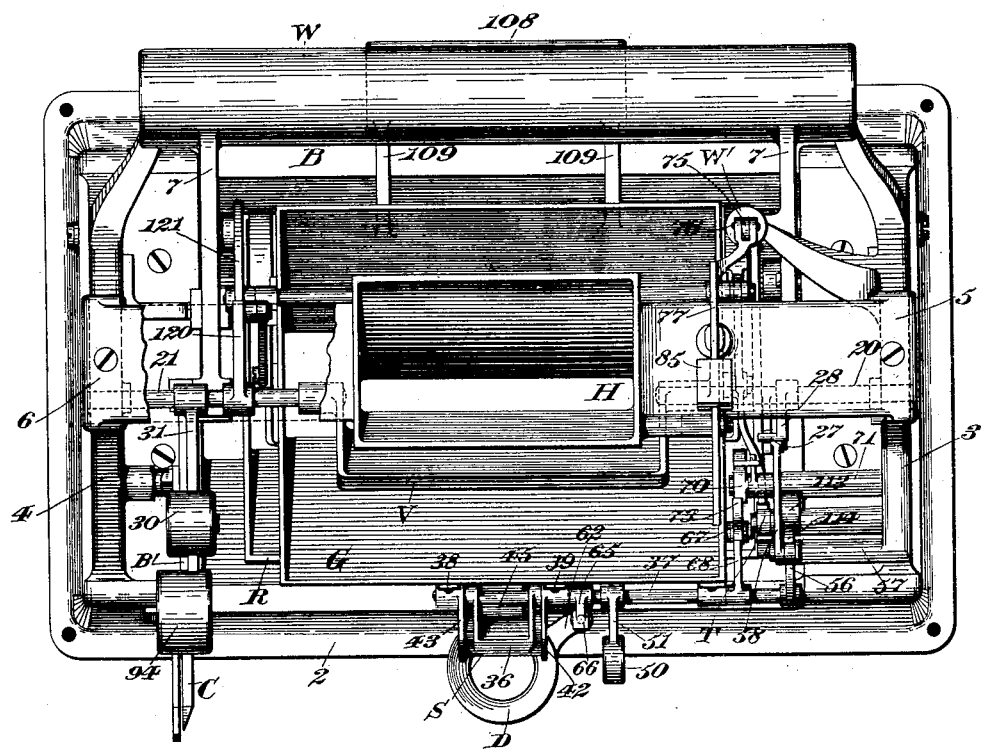

In the drawings accompanying and forming part of this specification, Figure 1 is a rear elevation of my improved weighing-machine. Fig. 2 is a plan view of the same. Figs. 3, 4, 5, and 6 are side elevations of the same as seen from the right in Fig. 1, showing the positions occupied by the various parts during the making and discharge of a load. Figs. 7, 8, and 9 are longitudinal central sections of the regulator-hopper and its connected parts in three different positions. Figs. 10, 11, and 12 are longitudinal central sections of the load-reducing valve, a portion of the load-receiver, and the parts adjacent thereto. Fig. 13 is a face view of the same. Fig. 14 is a detail in transverse section taken in the line *y y*, Fig. 12. Figs. 15 and 16 are detail views of a portion of the load-reducing means. Fig. 17 is a detail in elevation of a lever employed in connection with the counterpoising means; and Fig. 18 is a transverse section in the line *x x*, Fig. 17.

Similar characters designate like parts in all the figures of the drawings.

The framework for supporting the several parts of the machine may be of any preferred construction, it being represented consisting of a chambered bed or base 2, the side frames 3 and 4, and brackets 5 and 6, which extend oppositely from the supply hopper or chute H, said parts being secured together in some convenient manner.

The weighing-machine may be of any suitable construction, and, as usual, it consists of a suitable receiver in which the loads are built up and counterpoising mechanism therefor, the latter in the present case consisting of a plurality of counterweighted beams.

The load-receiver is designated by G, and it consists of a hopper-shaped receptacle suspended from the poising end of the main beam B, which latter is mounted in some well-known manner upon the framework of the machine and consists of a pair of longitudinal arms, as 7, joined at their extremities by a cylindrical counterweight W, which when the machine is at rest is borne by suitable stops on the framework.

The load-receiver G has the usual discharge-outlet in its lower end, the passage of material through said outlet being controlled by a suitable closer or valve, as L, consisting of a flat plate pivoted at 8 to the lower forward side of the load-receiver and adapted normally to cover the discharge-outlet, said closer being provided, preferably, with the rigid counterweighted plates 9 to shut the same on the discharge of a load.

The means for controlling the discharge of a load comprehends as a part thereof a latch, such as L', the latter consisting in the present case of a counterweighted lever pivoted at 10 to the load-receiver, the counterweighted arm 12 of said latch being provided with a shoulder 13, adapted to engage the lug 14 on the adjacent counterweighted closer-plate 9, the engagement being caused by reason of the counterweight on the arm 12.

My present invention comprehends the provision, in connection with weighing mechanism, of overloading and load-reducing means successively effective during the weighing of a load, the overloading means being adapted to deliver to the load-receiver a mass or quantity of material in excess of the predetermined load, such excess being removed by the load-reducing means.

The hopper H, which is located over the load-receiver to deliver a stream of material thereto, in connection with a suitable stream controller or valve, such as V, constitutes a convenient means for supplying an overload or overcharge to the receiver G.

The valve V is of the "oscillatory-pan" type, it being carried, preferably, by the two trunnions or shafts 20 and 21, respectively, the outer ends of which are journaled in suitable bearings on the side frames 3 and 4, respectively, and the inner ends of which are suitably secured to the hubs 22 and 23 on the opposite sides of the valve.

Figure 3:
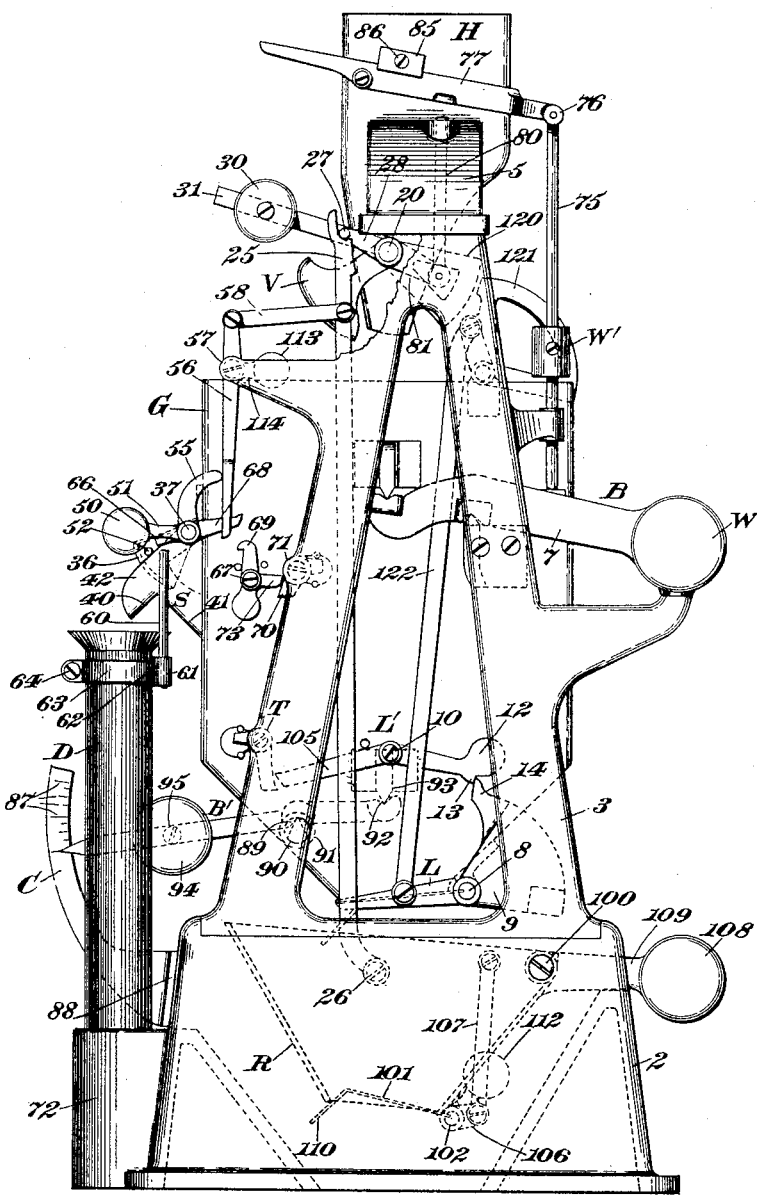

For the purpose of insuring the delivery of an overload to the load-receiver means are preferably provided for locking the valve V in its wide-open position (see Fig. 3) until the load-receiver has passed below the so-called "poising-line," the means shown consisting of the stop or rod 25, connected at one end to the normally stationary part or regulator R, supported in the base 2 and hereinafter more particularly described, the rod 25 being pivoted to said regulator, as at 26. The upper end of the rod 25 is adapted to engage under the projection 27, extending laterally from the crank-arm 28 on the valve-trunnion 20, as shown in Fig. 3, when the valve is in its wide-open position, means being provided to release the valve, preferably by tripping the rod 25 or disengaging it from the projection 27.

Any suitable means may be employed for advancing or shutting the stream controller or valve, whereby the stream from the hopper can be cut off, and for this purpose I have illustrated the weight 30, suitably secured to the arm 31, projecting rearward from the valve-trunnion 21.

It will be evident that when the stop or rod 25 is disengaged from the projection or pin 27 the weight 30 will be free to drop, and in so doing it will instantly swing the valve V under the outlet of the hopper H for stopping the supply to the load-receiver.

The load-reducing means comprehends, preferably as a part thereof, a suitable valve to control the emission of material through a suitable load-reducing opening in the receiver G, formed at a point between its receiving and delivery ends, such an opening being shown at 35 in the rear wall of the load-receiver. (See Figs. 10, 11, and 12.)

The load-reducing valve is designated by 36, it being suitably secured to the rock-shaft 37, journaled in hubs or bearings projecting oppositely from the spout S. The spout has at its upper end suitable ears, as 38 and 39, which can be secured to the load-receiver, the lower end of said spout having a suitable flange secured, preferably, to the inside of the load-receiver.

The spout-floor consists of two oppositely-disposed sections 40 and 41, leading, respectively, from and toward the load-receiver, the spout-section 40 being adapted to deliver the material removed from the load-receiver during the weighing of a load into a suitable receptacle and the spout-section 41 being adapted to cause any material in the spout on the discharge of a true load to run into the load-receiver.

The spout S has on its opposite sides the guard-walls 42 and 43 to prevent lateral flow of the material.

For the purpose of preventing the material from passing from the load-receiver too rapidly when the reducing-valve 36 is opened I have provided a suitable check device, as the overhanging hood 45, against which the mass runs in contact, having suitable walls, as 46, on its opposite sides, the hood proper and the two walls being flanged, as at 47, and the several flanges being secured suitably to the inside of the load-receiver.

It will be evident that when the mass in the load-receiver has reached a point above the load-reducing opening 35 and that when the valve 36 is opened the check device or hood 45 acts to hold back the material, so that it cannot spurt from the load-receiver.

The means for maintaining the load-reducing valve 36 in its shut position (represented in Figs. 3 and 10) to insure the overloading of the receiver G consists in the present case of the valve-closing device or weight 50, suitably secured to the arm 51, fixed to the valve-shaft 37, the weight holding the valve in its shut position and the projection 52 on the valve against the spout S or the wall 42 thereof, the spout acting as a stop to prevent the valve from being closed too far.

It will be remembered that the overloading-valve V is maintained in its wide-open position until the receiver G is overloaded, and for releasing said valve, whereby it may be shut, I prefer to employ means coöperative with the load-reducing valve, such means consisting in the present case of a trip device 55, in the form of a cam or curved arm, suitably secured to the valve-shaft 37. Said trip device 55 is adapted to coöperate with a suitable member connected with the stop-rod 25, such as the lever 56, pivoted to a suitable boss, as 57, on the side frame 3, the lower end of the lever 56 being disposed in the path of movement of the trip device or cam 55 and the upper end of said lever being connected suitably to the stop-rod 25, the link 58, pivoted, respectively, to said rod and lever, being shown for this purpose.

Figure 4:
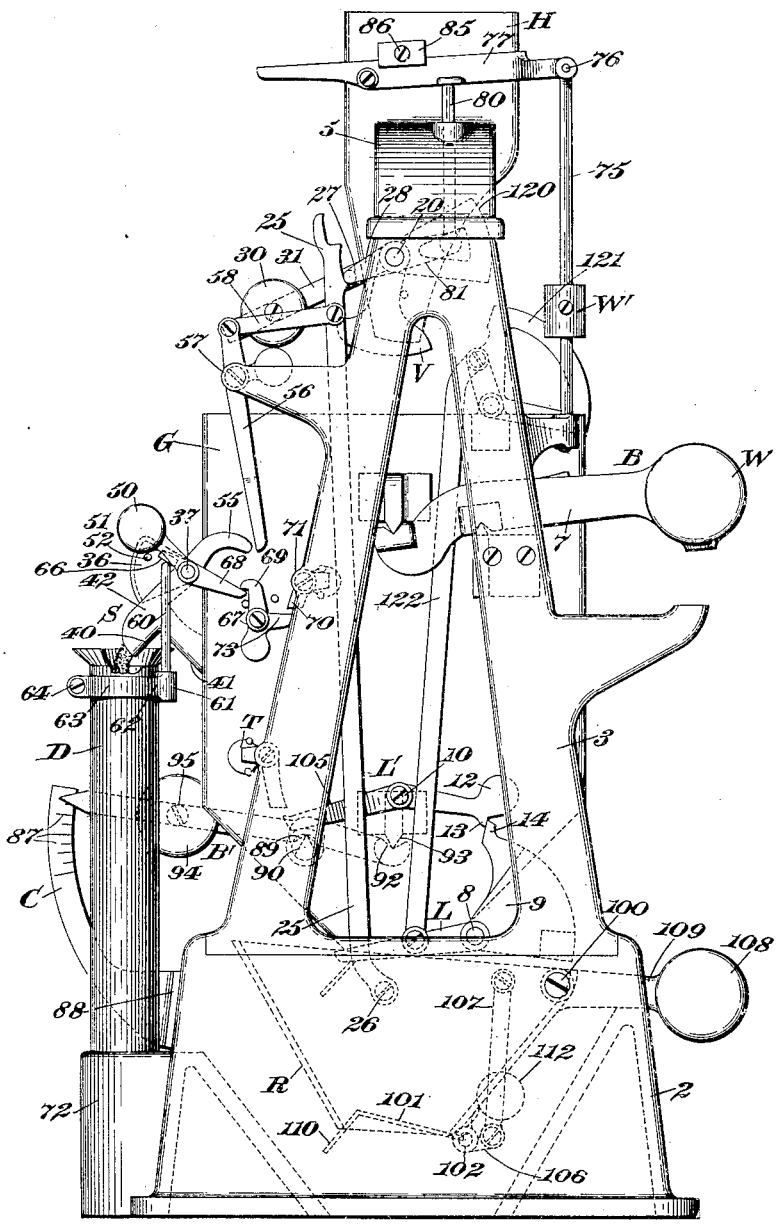

When the load-receiver G has almost reached the end of its downstroke, the trip device 55 will strike the lower end of the lever 56 and will swing the same, so that by reason of the connection between said lever and the stop-rod 25 the latter can be thrown from under the projection 27, as shown in Fig. 4, whereby the counterweight 30 can drop to close the valve V.

Any suitable means may be employed for opening the load-reducing valve 36, such as the stationary actuator 60, mounted on a fixed part of the machine and preferably adjustable. The actuator 60 is in the nature of an abutment disposed in the path of movement of a suitable device connected with the load-reducing valve, whereby when said device impinges against the actuator 60 the valve will be caused to open to permit the overload or surplus to pass from the load-receiver. The actuator 60 consists of a vertical post or bar suitably secured at it its lower end in the hub 61, formed on the projection 62 on the clamp 63. The clamp 63 embraces the cylindrical discharge-conduit D and is vertically slidable thereon, it, and consequently the actuator 60, being held in an adjusted position by the set-screw 64 on the clamp.

Figure 5:
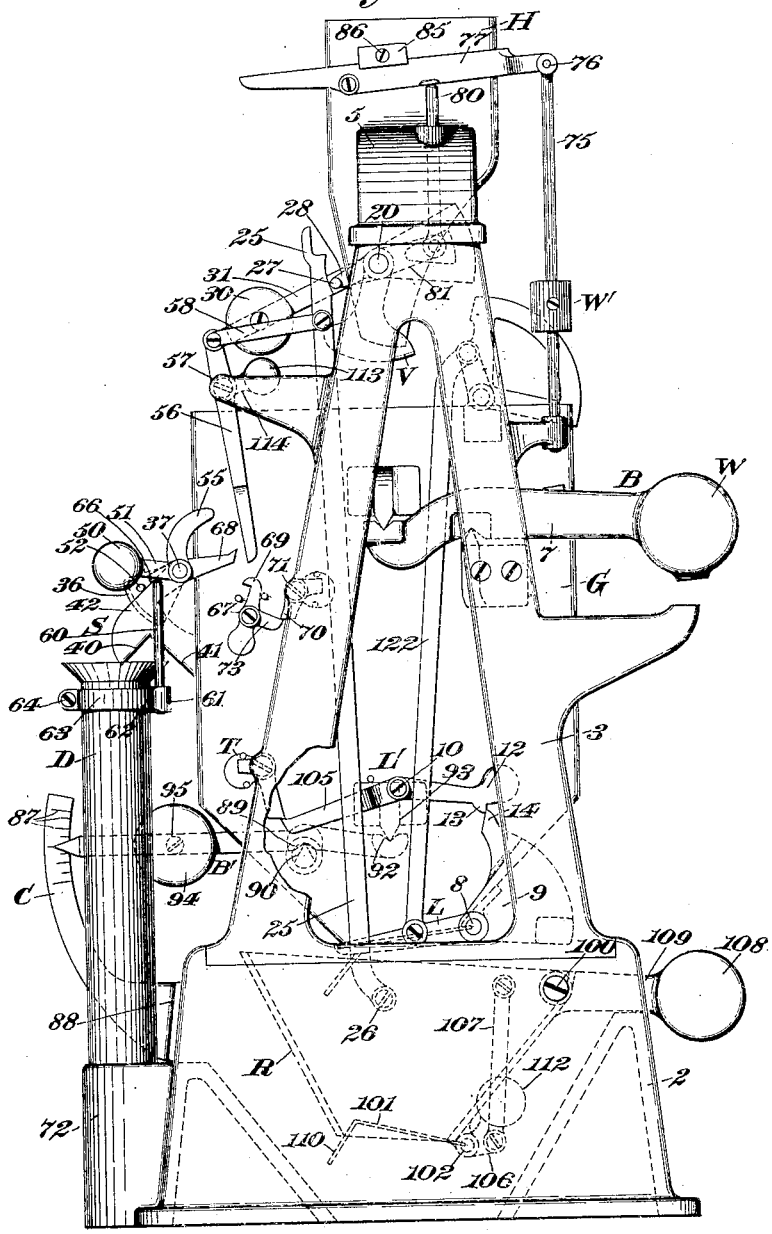

The shaft 37 has secured thereto at a suitable point the rearwardly-extending arm 65, the outer flattened end 66 of which is adapted to strike the upper end of the actuator 60, as shown in Fig. 5, when the load-receiver has reached a predetermined position, or at a time near the end of its descending movement, whereby on the further and slight descent of said load-receiver the load-reducing valve 36 is swung to its wide-open position, (shown in Fig. 4,) where it can be engaged by a suitable detent or latch, such as 67, pivoted to the load-receiver, said latch being adapted to engage the forward extending arm 68 on the valve-shaft 37. The latch 67 is counterweighted, whereby its catch 69 will be caused to engage the coöperating arm 68 of the valve 36 when the latter is opened, as just specified, the action of the valve-holding latch being limited by suitably-positioned stops on the load-receiver. On the opening of the valve in the manner just specified the surplus can flow from the load-receiver through the spout S and enter the discharge-conduit D, above which said spout is situated.

It will be apparent that when the material is removed from the load-receiver it will rise, and during this motion the latch 67 will be tripped by suitable means, whereby the valve 36 can be instantly shut by the dropping of the weight 50 to stop the further withdrawal of material from the load-receiver, it being understood that when the latch 67 is thus tripped the load is completed.

The means for tripping the latch consist in the present case of the by-pass 70, of ordinary construction, pivoted to the boss 71, extending inward from the frame 3. On the downstroke of the load-receiver and when the same has nearly reached the end of such movement the arm 73 of the latch 67 will impinge against the by-pass 70 and thrust the same to one side. On the ascent of the load-receiver on the removal of the surplus in the manner just alluded to and when the load has reached completion the arm 73 will strike the by-pass 71, which is then in the nature of a fixture on the frame, the latch thereby being tripped and its hook 69 disengaged from the coöperating arm 68 of the load-reducing valve, whereby the latter can be closed.

The discharge-conduit D is in the nature of a vertically-disposed cylindrical pipe or tube secured at its lower end in the chambered extension 72 on the rear side of the base, the material withdrawn from the load-receiver entering said discharge-conduit, and it can be disposed of in the manner shown and described by the Letters Patent hereinbefore referred to.

For the purpose of preventing the descent of the load-receiver G until the same is nearly overloaded or overcharged I provide, in connection with the weighing mechanism, a suitable resistance or counterpoise adapted to act against one of the members of the weighing mechanism. The counterpoise is in the form of a weight W', suitably secured to the reciprocatory slide-bar 75, the lower end of the bar being adapted to apply its effect or bear against the counterpoised side of the beam B at the commencement of the weighing operation, thereby to increase the weight of the counterpoise mechanism sufficiently to compensate for the overcharge, the weight W' being thrown out of action relatively to the weighing mechanism at a predetermined point in the operation, or when the load-receiver is overloaded, whereby the poising operation can be effected with accuracy.

The slide-bar 75 is pivoted, as at 76, to the oscillatory lever 77, the latter being likewise mounted upon the supply-hopper H. At the commencement of operation, as will be seen in Fig. 3, the lower end of the weighted slide-bar 75 will be in contact with the scale-beam B, thereby to retard its action, and consequently the descent of the load-receiver. When, however, the load-receiver descends, the counterpoise side of the beam B, and consequently the slide-bar 75, will be raised, and at a predetermined time in the operation, or when the load-receiver has been overloaded, means are brought into action for shifting or lifting the slide-bar out of contact with the beam, and the means herein represented for this purpose are connected with the valve for operation.

The device for shifting the slide-bar is designated by 80 and consists of a reciprocatory bar passing through a suitable guide-aperture in the bracket 5 and connected, preferably, by a pivotal joint at its lower end with the crank-arm 81 on the valve-shaft 20. When the valve V is released in the manner hereinbefore set forth, the bar 80 will be thrust quickly upward and, engaging the right-hand arm of the lever 77, as shown in Fig. 4, will raise said arm, and consequently the weighted slide 75, to a point above the beam B. When the valve V is opened, the slide-bar 75 of course will be released and can drop until it reaches the beam.

For the purpose of varying the effect of the counterpoise device on the weighing mechanism the lever 77 is preferably furnished with the slidable split weight 85, partially embracing the same and held in an adjusted position by the set-screw 86, the weight being slid along the lever at either side of the center of oscillation of the lever to vary the resistance applied to the beam.

For the purpose of determining readily the accuracy of the work done by the machine I provide in conjunction therewith a suitable scale and pointer, an auxiliary beam preferably serving as such a pointer. The scale is designated by C, it consisting of a segmental plate provided with suitable graduations, as 87, near its upper end, the lower end of said scale-plate terminating in a shoe 88, by which the device can be secured to the base 2 in some suitable manner, as by ordinary holding-screws. The pointer for the scale consists, preferably, of an auxiliary beam B′, fulcrumed upon the framework, it being shown equipped with a notch-bearing, as 89, resting on a knife-edge pivot 90, secured to the hub 91 on the inside of the frame member 4, said auxiliary beam, which is in the form of a lever, being adapted to act against the load-receiver. The inner end of the auxiliary beam is notched, as at 92, the notch being adapted to receive a knife-edge pivot 93, suitably secured to the load-receiver. As the load-receiver ascends and descends during the making of a load the correctness of the work can be determined by an inspection of the scale-plate C, and if there be any difference between the load-receiver G and the counterpoise-weight W the sliding weight 94 on the auxiliary beam can be moved along the same to make up for any difference, said weight being held in an adjusted position by the set-screw 95.

Figure 6:
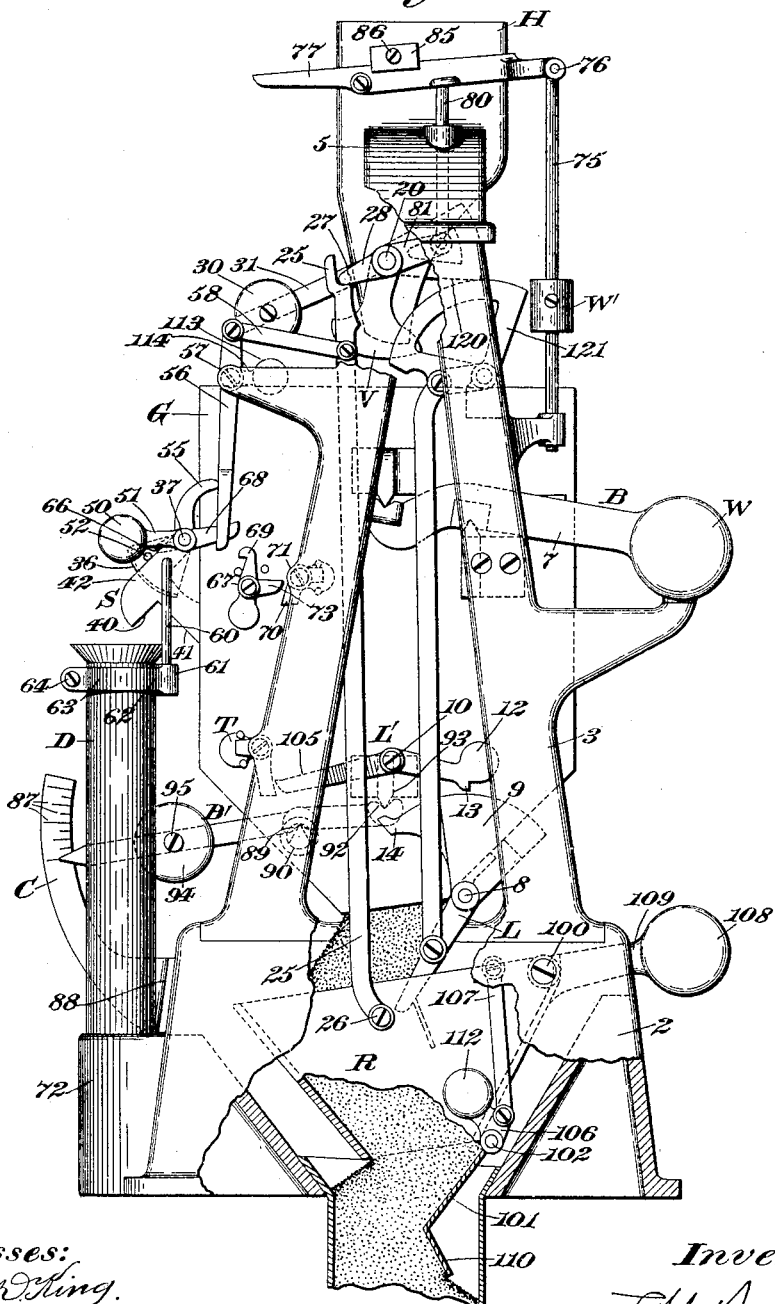

The latch L′, which holds the closer against opening movement during the loading period, is tripped in the present case by a tripper, as T, on the framework, said tripper consisting of a by-pass of ordinary construction coöperative with the arm 105 of the latch, said arm being adapted to strike and to force the by-pass tripper to one side on the downstroke of the load-receiver, but on the upstroke of said load-receiver the arm 105 will abut against the tripper, as shown in Fig. 6, whereby the counterweighted arm 12 of said latch will be lifted and disengaged from the lug 14 of the closer, thereby freeing the latter, so that it can be opened by the pressure of the material in the load-receiver.

The regulator R, to which I have hereinbefore referred, constitutes a convenient actuator for opening the valve V, it being thrown into operative relation therewith at the proper point, and the power of the regulator as it rises being transmitted to the valve by a suitable device, the rod 25, to which reference has hereinbefore been made, constituting a suitable medium for this purpose. The regulator consists in the present case of a valved regulator-hopper pivoted at 100 for reciprocatory movement in the base 2, the valve of said regulator being designated by 101 and pivoted to one side thereof, as at 102, whereby the regulator will be caused to retain a sufficient quantity of material to insure its being carried downward. When the empty regulator R rises, it being preferably counterweighted, it is adapted to thrust the rod 25 upward to open the valve.

The pivot 102 of the regulator-valve 101 consists of a transverse rock-shaft suitably supported by the regulator and having affixed thereto at one end the crank-arm 106, connected to a suitable resistance member, such as the base 2, the connection between these parts being shown as the link 107, pivoted to the crank-arm 106 and also to the inside of the base, as shown in Fig. 1, the several pivots being so located that when the regulator-valve is open the several pivots will be located substantially in line, whereby the valve can be held open and the regulator R in its depressed position by a minimum pressure on the valve. The regulator is returned to its normal position preferably by a counterweight, as 108, secured to the outer end of the arm 109, fixed to the said regulator.

When the latch L′ is tripped, the closer L is released and is forced open by the weight of the material in the load-receiver, such material being discharged into the regulator-hopper R and nearly filling the same, whereby the weight 108 will be overbalanced and the regulator caused to drop, the valve 101, by reason of its connection with the base 2, being opened to permit the material to pass from the regulator, and the deflected or angular portion or lip 110 of the regulator-valve 101, acting against the discharging material, will insure the valve being held open until all the material has passed therefrom, the several centers of the toggle members 106 and 107 being in line. When all the material has passed from the regulator, the weight 108 can drop, and in so doing elevates the regulator or returns it to its final position.

For the purpose of securing a more efficient action of the valve 101 it is balanced, the weight 112, secured to the crank-arm 106, being shown for this purpose.

It will be evident that when the regulator-hopper R is depressed in the manner specified the rod 25 will be drawn downward, so that its upper end can be thrust under the projection 27, suitable means being provided to accomplish this result. The means provided in the present case for effecting this result consists of the weight 113 on the arm 114, movable concentrically with the lever 56, said weight being adapted, when the upper end of the rod reaches a point opposite the projection 27, to throw the rod under said projection, so that when the empty regulator R rises the valve V can be forced open, as will be apparent.

The usual interlocking stops are shown at 120 and 121, connected, respectively, with the valve V and the closer L, each of said stops being adapted to block the action of the other, the stop 121 being mounted on the load-receiver and connected to the closer L by the rod 122, while the coöperating stop 120 is fixed to the trunnion 21.

The operation of the hereinbefore-described machine, briefly stated, is as follows: Fig. 3 represents the positions occupied by the several parts at the commencement of operation, the valve 36 and closer L being maintained in their shut positions, as hereinbefore specified, and the supply-valve V held in its wide-open position by the stop-rod 25, so that the full volume of the supply from the hopper H can gravitate into the empty receiver to overload the same. When a certain percentage of the predetermined charge is in the load-receiver, it, with the inner end of the beam B, will be lowered, such motion continuing until said receiver is overloaded, just prior to which the cam-arm 55 will strike the lower arm of the lever 56 and swing the same to the right, thereby oppositely swinging the rod 25, whereby the latter will be thrown from under the projection 28 to release the valve V. When the valve V is released, the weight 30 will drop to shut the same, as shown in Fig. 4. At a point immediately preceding the time the load-receiver G reaches the limit of its downstroke the flattened end of the arm 65 will impinge against the upright actuator 60, as seen in Fig. 4, whereby the valve 36 will be swung open, as illustrated in said figure, to permit the surplus to pass therefrom through the opening 35, the material passing into the discharge-conduit D. As the receiver lightens, the weight 50, when released, as hereinbefore specified, by falling, will shut the load-reducing valve, as shown in Fig. 5, to stop the further withdrawal of material from the load-receiver. When the receiver G reaches its lowest position, the latch L' thereon will pass onto the tripper T, whereby on the ascent of said receiver and when the load is completed the latch will abut against the tripper to elevate the counterweighted arm 12, thereby to disengage the latter from the lug 14 of the closer. The material is then discharged into the regulator-hopper R, depressing the same and drawing the rod 25 downward, whereby it can be thrown under the projection 27 by the weight 113, so that when the empty regulator R rises the valve can be opened. When all the material passes from the load-receiver and the regulator-hopper, the several parts will be returned to their primary positions to repeat the operation.

Having described my invention, I claim—

1. The combination, with weighing mechanism embodying a load-receiver and counterpoising means therefor, of overloading and load-reducing means; a resistance device supported by the framework and in position to apply its effect normally to the counterpoising means; and means for automatically shifting said resistance device out of operative relation with the counterpoising means when the load-receiver has received a supply of material in excess of the predetermined load.

2. The combination, with weighing mechanism embodying a load-receiver and a scale-beam, of a counterweighted device carried upon the framework above the scale-beam and in position normally to bear against said scale-beam; a supply apparatus; and means coactive with the supply apparatus for shifting said counterweighted device out of operative relation with the beam when the load-receiver reaches a certain point.

3. The combination, with weighing mechanism embodying a load-receiver and a scale-beam, of a resistance device supported independently of the scale-beam and mounted upon the framework for operation and adapted normally to act against the scale-beam; a supply apparatus; and movably-mounted means coactive with the supply apparatus for shifting the resistance device out of operative relation with the scale-beam.

4. The combination, with weighing mechanism embodying a load-receiver, of overloading and load-reducing means successively effective during the weighing of a load, said overloading means embodying a valve; a resistance device in position to act against the weighing mechanism; and means operative with said valve for shifting said resistance device.

5. The combination, with weighing mechanism embodying a load-receiver and a scale-beam, of a valve; a resistance device in position to act against one of the members of the weighing mechanism; and means operative with the valve, for shifting said resistance device.

6. The combination, with weighing mechanism embodying a load-receiver and a scale-beam, of a weighted slide adapted to act against one of the members of the weighing mechanism; stream-supplying means embodying a valve; and means operative with said valve for raising said slide when the load-receiver has reached a certain point.

7. The combination, with weighing mechanism embodying a load-receiver and a scale-beam, of a resistance device adapted to act against one of the members of the weighing mechanism; a lever to which said resistance device is connected; a valve; and means operative with the valve, for shifting said lever.

8. The combination, with weighing mechanism embodying a load-receiver and a scale-beam, of a valve and its supporting-shaft provided with an arm; a weighted slide-bar adapted to act against one of the members of the weighing mechanism; and means connected to said arm, for shifting the slide-bar.

9. The combination, with weighing mechanism embodying a load-receiver and a scale-beam, of a weighted slide-bar in position to act against one of the members of the weighing mechanism; a lever to which the bar is connected; a valve and its shaft provided with an arm; and a device connected to said arm, for engaging said lever.

10. The combination, with weighing mechanism embodying a load-receiver and a scale-beam, of means for applying a resistance to the scale-beam; a device adapted to vary the resistance applied; a supply-valve; and means operative with the supply-valve for shifting the resisting means out of operative relation with the scale-beam.

11. The combination, with weighing mechanism; of overloading and load-reducing means, the overloading means embodying a valve; a stop normally operative to hold said valve in its open position; and a device coöperative with the load-reducing means, for tripping said stop.

12. The combination, with weighing mechanism; of overloading and load-reducing means, each embodying a valve; a stop for holding the overloading-valve in an open position for a predetermined length of time; and means connected with the load-reducing valve, for tripping said stop.

13. The combination, with weighing mechanism, of overloading means comprehending a valve; a stop-rod adapted to engage a device connected with the valve; load-reducing means; and instrumentalities coöperative with the load-reducing means, for tripping said rod.

14. The combination, with weighing mechanism, of overloading means embodying a valve; a shaft for supporting the valve, said shaft having a crank-arm furnished with a projection; a stop in position to engage the projection; load-reducing means; and instrumentalities coöperative with the load-reducing means, for tripping said stop.

15. The combination, with weighing mechanism embodying a load-receiver, of means for delivering to the load-receiver a supply of material in excess of the predetermined load; load-reducing means embodying a valve; means for opening the valve to permit the surplus to pass from the load-receiver; a stop situated to hold the overloading-valve in its open position; and means embodying a device shiftably mounted upon the load-receiver for tripping said stop when the load-receiver reaches a certain point.

16. The combination, with weighing mechanism, of overloading and load-reducing means each embodying a valve, the overloading-valve being counterweighted; a stop located to hold the counterweighted valve in its open position; and means coöperative with the load-reducing valve, for tripping said stop.

17. The combination, with weighing mechanism, of overloading and load-reducing means each embodying a valve; a regulator in position to receive the loads discharged by the weighing mechanism; a stop connected to the regulator and located to hold the overloading-valve in its open position; and means connected with the load-reducing valve, for tripping said stop.

18. The combination, with weighing mechanism, of overloading and load-reducing means each embodying a valve; a stop located to hold the overloading-valve in its open position; a lever connected with said stop; and means operative with the load-reducing valve, for engaging said lever.

19. The combination, with weighing mechanism, of overloading and load-reducing means each embodying a valve; a stop located to hold the overloading-valve in its open position; a lever; a link connected, respectively, with the lever and stop; and a device connected with the load-reducing valve, for engaging said lever.

20. The combination, with weighing mechanism, of overloading and load-reducing means each embodying a valve; a stop located to hold the overloading-valve in its open position; a lever mounted on the framework and connected by a link to said stop; and a cam connected with the load-reducing valve and adapted to engage said lever.

21. The combination, with weighing mechanism, of overloading and load-reducing means each embodying a valve, the load-reducing valve being counterweighted; a stop located to hold the overloading-valve in its open position; and means connected with the load-reducing valve, for tripping said stop.

22. The combination, with weighing mechanism embodying a load-receiver, of means for delivering to said load-receiver a supply of material in excess of the predetermined load; load-reducing means including a valve; an adjustable actuator in position to open said valve when the load-receiver reaches a certain point in its descent, thereby to permit the surplus to pass from the load-receiver; means for closing the valve when the surplus has been removed; and a surplus-receiving device.

23. The combination, with weighing mechanism embodying a load-receiver, of means for delivering to the same a supply of material in excess of the predetermined load; load-reducing means embodying a valve; a discharge-conduit located to receive the material removed from the load-receiver by the load-reducing means; an actuator on said conduit, for opening the load-reducing valve, thereby to permit the surplus to pass from the load-receiver; and means for closing the valve when the surplus has been withdrawn.

24. The combination, with weighing mechanism including a load-receiver, of overloading and load-reducing means, the load-reducing means including a valve; a discharge-conduit located to receive the material withdrawn from the load-receiver; a clamp embracing said discharge-conduit and provided with an actuator for opening the load-reducing valve when the load-receiver reaches a certain point in its descent.

25. The combination, with weighing mechanism including a load-receiver, of overloading and load-reducing means each including a valve; a stop located to hold the overloading-valve in its open position; means operative with the load-reducing valve, for tripping said stop; and means for opening the load-reducing valve when the stop is tripped.

26. The combination, with weighing mechanism, of overloading and load-reducing means each including a valve; a stop located to hold the overloading-valve in its open position; means coöperative with the load-reducing valve, for tripping said stop; and a stationary actuator situated to open the load-reducing valve at a predetermined point in the descent of the load-receiver and subsequently to the tripping of said stop.

27. The combination, with weighing mechanism including a load-receiver provided with a spout, of overloading and load-reducing means the load-reducing means embodying a valve provided with a projection; means operative with the valve, to hold the same shut and the projection thereon against the spout; a device operative, at a predetermined point in the descent of the load-receiver, to open the valve; and a detent situated to hold said valve open.

28. The combination, with weighing mechanism including a load-receiver, of overloading and load-reducing means, the latter embodying a valve; a stationary actuator in position to open the valve when the load-receiver reaches a certain point; and a latch located to hold the valve in its open position.

29. The combination, with weighing mechanism including a load-receiver having an opening, of overloading means; a valve mounted adjacent to said opening; valve-actuating means; and a blade projecting from the load-receiver and located relatively to the opening to check the flow of material passing therefrom.

30. The combination, with weighing mechanism including a load-receiver provided with an opening, of overloading means, a valve mounted adjacent to said opening; valve-actuating means; and a hood situated over said opening and in position to check the flow of material through the same.

31. The combination, with weighing mechanism including a load-receiver provided with an opening, of a spout secured to the load-receiver, its floor consisting of two oppositely-inclined sections leading toward and from the opening; and a valve in position to govern the flow of material through said opening.

32. The combination, with weighing mechanism including a load-receiver, of a valved regulator-hopper in position to receive and to be depressed by a load from the load-receiver; stream-supplying means; a valve; a rod pivoted to the regulator; means on the framework for throwing said rod into operative relation with the valve, whereby, on the descent of the regulator, the valve will be opened; and a toggle connected, respectively, with the valve of the regulator-hopper and the framework.

33. The combination, with weighing mechanism, of a gravity-resistant located to oppose the working movement of the weighing mechanism; a supply apparatus located and adapted to regulate the supply of material to the weighing mechanism; and means operative with the supply apparatus for shifting the resistant out of operative relation with the weighing mechanism on the operation of the supply apparatus to cut off the supply of material.

FRANCIS H. RICHARDS.

Witnesses:
F. N. CHASE,
ANDREW FERGUSON.